United States Patent [19]

Baginski

[11] Patent Number: 4,862,458
[45] Date of Patent: Aug. 29, 1989

[54] MULTIPLEXED BUILT IN TEST EQUIPMENT

[75] Inventor: Mark J. Baginski, Boyd Tavern, Va.

[73] Assignee: Sperry Marine Inc., Charlottesville, Va.

[21] Appl. No.: 97,976

[22] Filed: Sep. 17, 1987

[51] Int. Cl.⁴ ............................................. G06F 11/22
[52] U.S. Cl. ......................................... 371/15; 370/13
[58] Field of Search ....................... 371/62, 29, 22, 15; 370/84, 13, 14, 15

[56] References Cited

U.S. PATENT DOCUMENTS 3,939,453  2/1976  Schroeder ........................ 371/29 X
4,376,998  3/1983  Abbott ............................. 371/71 X
4,601,028  7/1986  Huffman ........................... 370/84 X
4,617,658  10/1986  Walters ........................... 370/84

Primary Examiner—Jerry Smith
Assistant Examiner—Robert W. Beausoliel
Attorney, Agent, or Firm—Seymour Levine

[57] ABSTRACT

Built-in test equipment performs time out tests on a plurality of fast lines and a plurality of slow lines with respect to a short time interval and a long time interval respectively. The fast inputs are multiplexed under control of a first sequencing counter and the slow inputs are multiplexed under control of a second sequencing counter. The counter outputs set up logic so as to differentiate the error status with respect to the lines. Additional counters sequence the logic through the operations to be performed on the lines and are utilized to clock the sequencing counters.

4 Claims, 4 Drawing Sheets

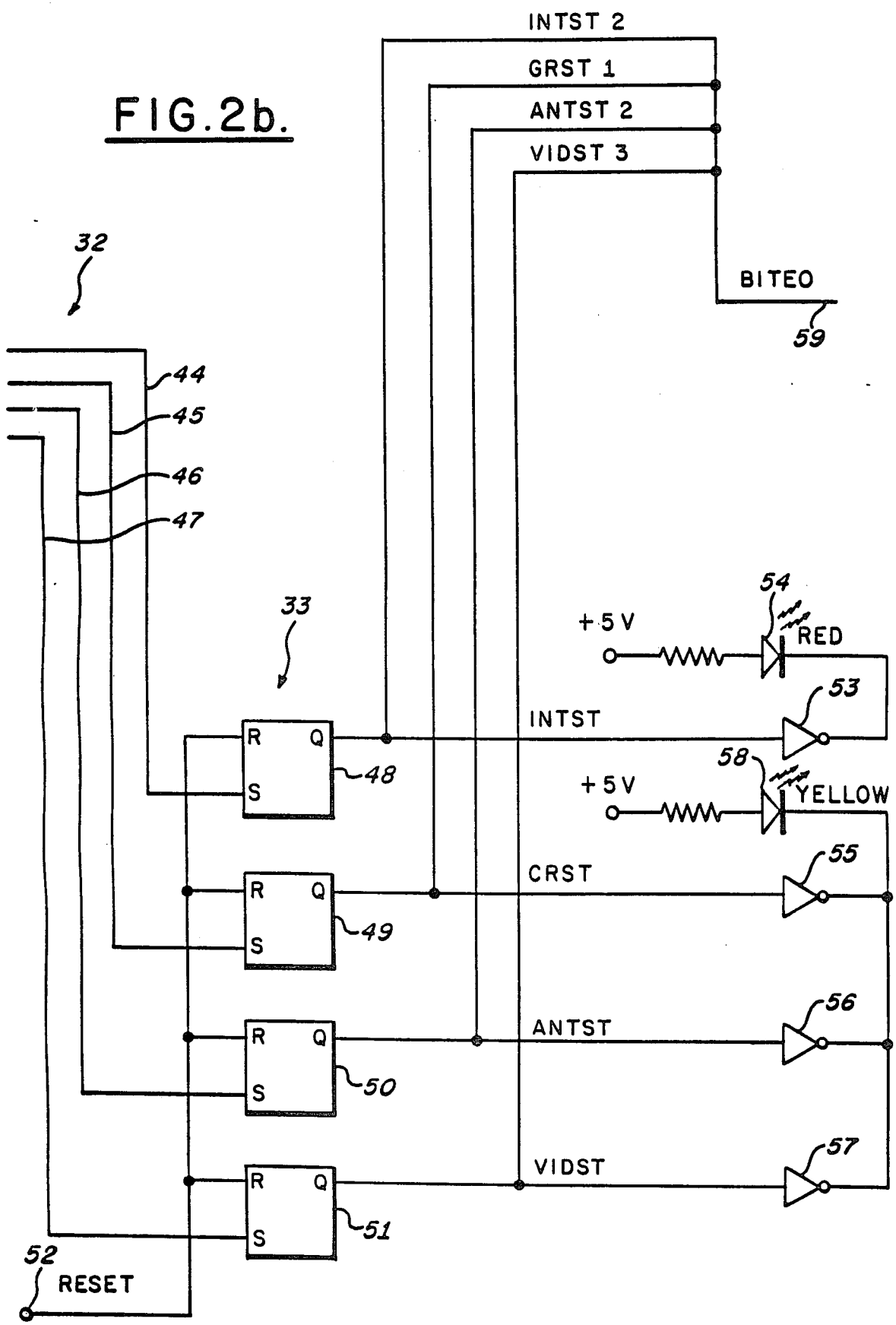

MULTIPLEXED BUILT IN TEST EQUIPMENT

BACKGROUND OF THE INVENTION

1. Field of the Invention

The invention relates to built in test equipment (BITE).

2. Description of the Prior Art

BITE circuitry is utilized in the prior art to provide the on-line error status of a plurality of signal lines on, for example, printed wiring boards utilized in electronic systems and subsystems. Traditionally, each line is monitored by separate dedicated built in test circuits that monitor the on-line error status of the line. BITE implementations usually require extensive hardware particularly when large numbers of signal lines to be monitored are involved. Typically the BITE circuitry may comprise 20% of the system resulting in excessively large and expensive designs. Additionally since, in the prior art, most BITE designs require separate dedicated hardware for each signal line monitor, the number of signal lines tested is limited. Another prior art approach to BITE is to combine logic chips into a gate array. Although this approach reduces hardware, the cost is excessive.

SUMMARY OF THE INVENTION

The disadvantages of the prior art are overcome by time multiplexing, via a multiplexor, the plurality of signal lines to be monitored into built in test circuits for performing a predetermined test on the lines. A sequencer provides control signals to the multiplexor for sequentially applying the signal lines to the test. Means responsive to the sequencer control signals differentiates the error status with respect to the lines being tested. Additionally, separate tests may be applied to separate groups of signal lines.

BRIEF DESCRIPTION OF THE DRAWINGS

FIGS. 2a and 2b are detailed logic diagrams of the multiplexed BITE of the present invention.

DESCRIPTION OF THE PREFERRED EMBODIMENT

Figure 1:
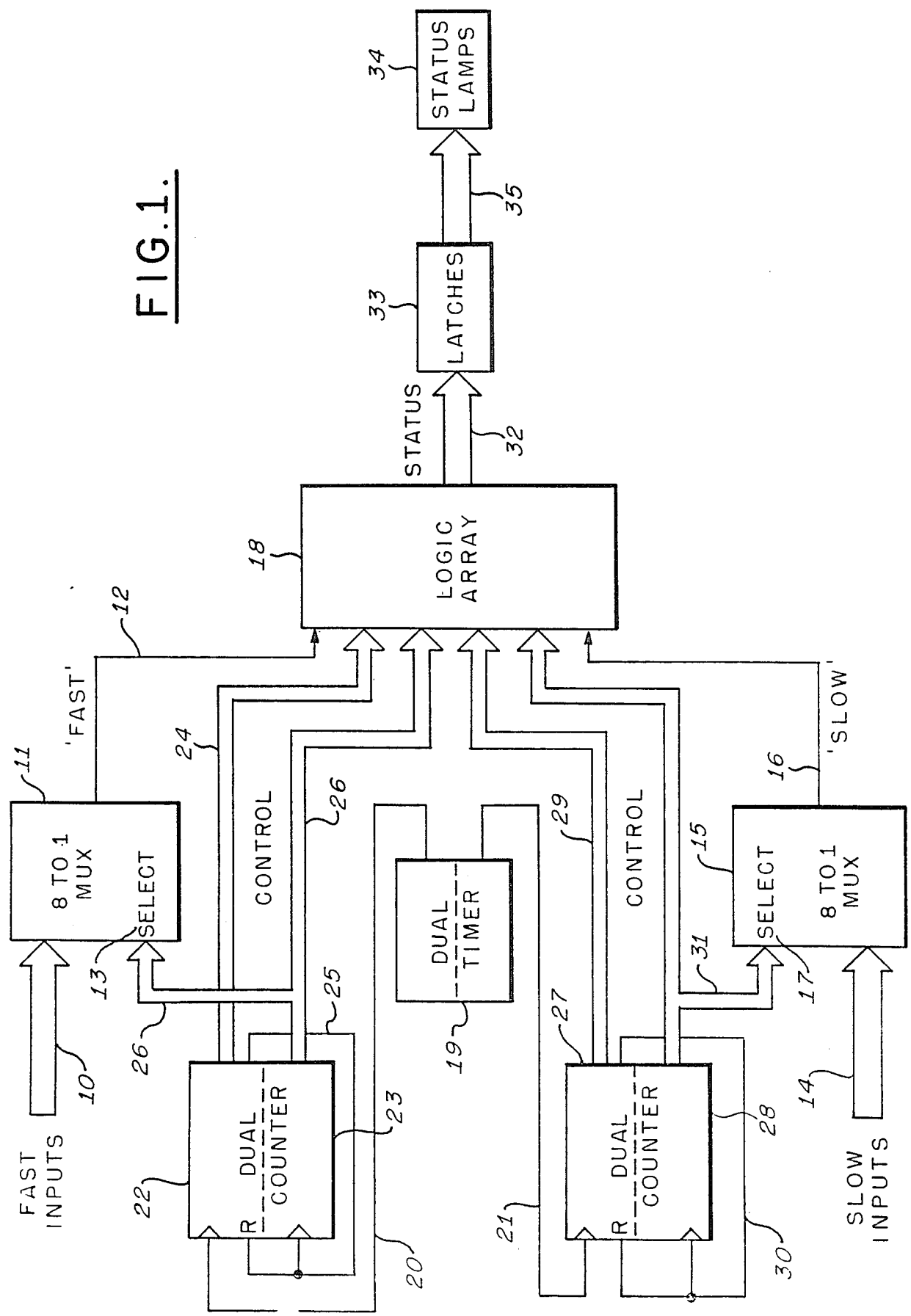
FIG. 1 is a schematic block diagram of the multiplexed BITE of the present invention.

Referring to FIG. 1, a schematic block diagram of the multiplexed built-in test equipment configured in accordance with the present invention is illustrated. The built-in test applied to each of the lines to be monitored comprises determining if the line toggles within a given time period. The lines to be monitored are of two types, "fast" and "slow". Each of the monitored lines indicates proper operation when the line toggles within a predetermined time interval. The "fast" lines must toggle within a time interval that is shorter than the time interval for the "slow" lines. When a line does not toggle within the appropriate time interval, a time out error has occured and an appropriate error status is displayed in a manner to be described.

The "fast" lines to be monitored are applied as inputs 10 to a multiplexor 11. The multiplexor 11 selectively applies the input lines 10 to an output line 12 in accordance with a select input 13 to the multiplexor 11. In a similar manner, the "slow" lines to be monitored are applied to inputs 14 of a multiplexor 15. The multiplexor 15 selectively applies the input lines 14 to an output line 16 in accordance with a select input 17 to the multiplexor 15. In the BITE technology it is often required to monitor signals at varying speeds. The BITE implementation of FIG. 1 permits the varying speed "fast" and "slow" signals to be monitored simultaneously. The multiplexor 11 has the capacity to receive 8 "fast" inputs and the multiplexor 15 has the capacity to accept 8 "slow" inputs. Thus, each of the multiplexors 11 and 15 comprises an 8:1 multiplexor. The embodiment of FIG. 1 permits monitoring up to 16 signal lines by the hardware required for only one line while differentiating error status. Separate timing is utilized to test the "fast" inputs and the "slow" inputs simultaneously in a manner to be described.

The "fast" output line 12 from the multiplexor 11 and the "slow" output line 16 from the multiplexor 15 are applied as inputs to a logic array 18. A dual timer 19 generates a fast clock signal on a line 20 and a slow clock signal on a line 21. In the preferred embodiment of the invention the fast clock rate is 377 Hz and the slow clock rate is 1.32 Hz. The fast clock signal on the line 20 is applied to the clock input of a 4-bit counter 22. The counter 22 comprises one-half of a dual counter chip which also includes a 4-bit counter 23. The outputs of the first and second stages of the counter 22 are applied via lines 24 as inputs to the logic array 18. The signals on the lines 24 control the sequencing of test operations performed on each of the "fast" input lines 10 by the logic array 18. The output from the third stage of the counter 22 is applied via a line 25 as the clock input to the counter 23 and the reset input to the counter 22. The fourth stage of the counter 22 is not utilized.

The outputs from the stages of the counter 23 are applied on lines 26 to the select input 13 of the multiplexor 11 to sequentially select the inputs 10 thereof and are also applied to the logic array 18 to channel the "fast" input on the line 12 to the correct test path for appropriate error status differentiation. In a manner to be described hereinafter in detail, the dual counter 22, 23 sequentially selects the "fast" input lines to be monitored, controls the logic array 18 to set up and perform each test and then reset to continuously execute the BITE function with respect to the input lines.

In a similar manner, the slow clock signal on the line 21 is applied to the clock input of a 4-bit counter 27. The counter 27 comprises one-half of a dual counter chip which also includes a 4-bit counter 28. The outputs of the first two stages of the counter 27 are applied on lines 29 to the logic array 18 for controlling the sequence of operations to be performed in testing each of the input lines. The output of the third stage of the counter 27 is applied via a line 30 to the clock input of the counter 28 and the reset input of the counter 27.

The outputs from the stages of the counter 28 are applied via lines 31 to the select input 17 of the multiplexor 15 to sequentially select the "slow" inputs for test. The outputs from the stages of the counter 28 on the lines 31 are also applied to the logic array 18 to channel the "slow" input to the correct test path. The dual counter 27, 28 sequentially selects the "slow" inputs to be tested and sets up the appropriate paths of the logic array 18 for performing the tests on the sequentially applied lines. The dual counters 27, 28 then reset so as to continuously apply the BITE tests to the "slow" input lines. It is appreciated that the "fast" inputs to the multiplexor 11 and the "slow" inputs to the multiplexor 15 are simultaneously monitored by the BITE equipment of FIG. 1.

The logic array 18 provides a plurality of status outputs on lines 32 which are latched in respective latches 33. The outputs of the latches 33 are applied to status lamps 34, via lines 35, for indicating and differentiating the error status of the "fast" and "slow" input lines in a manner to be described.

Figure 2A:
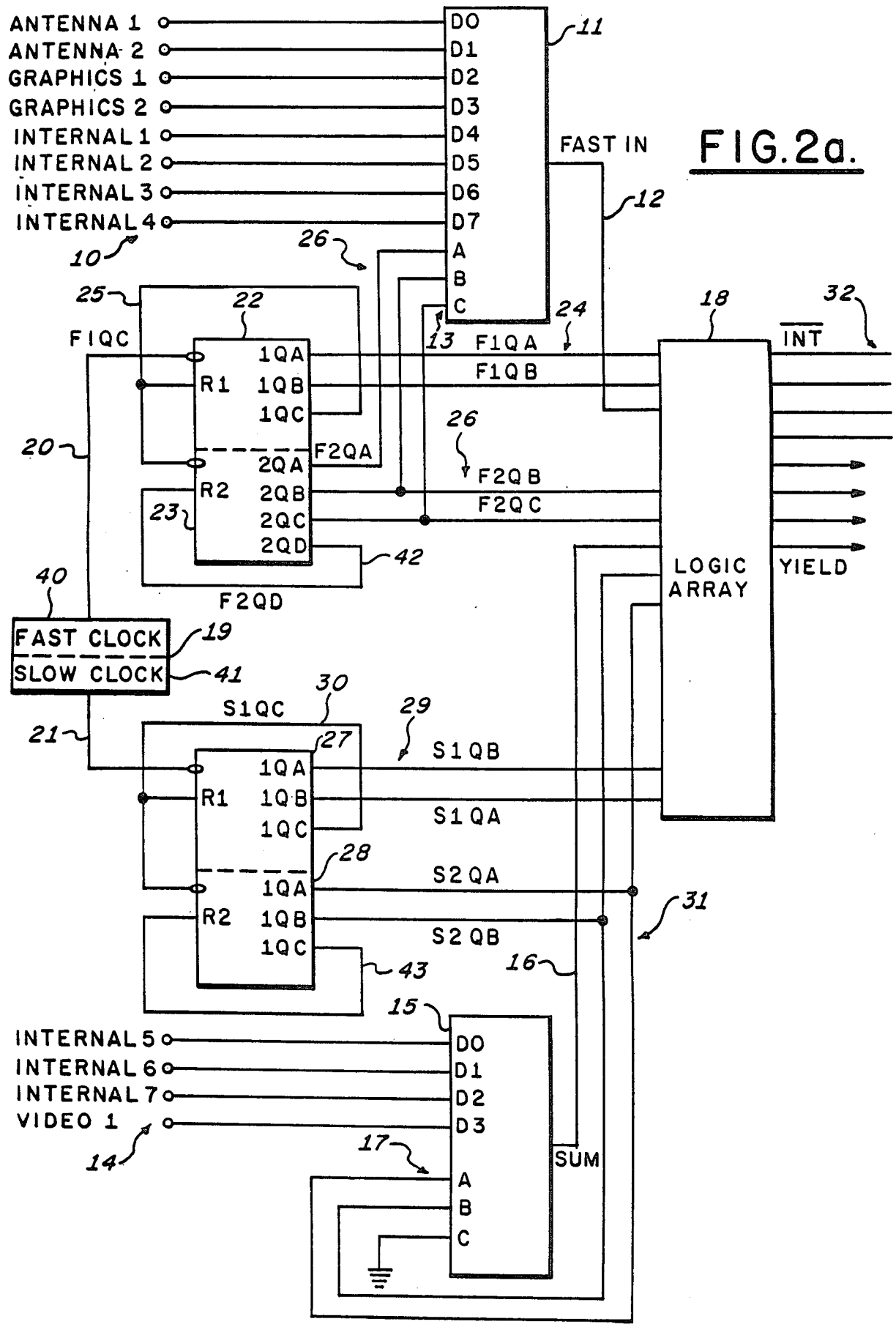

Referring to FIG. 2, in which like reference numerals indicate like components with respect to FIG. 1, a detailed logic schematic diagram of the BITE of the present invention is illustrated. The embodiment of the present invention is implemented for use in a radar system having a video display with a graphics capability. The BITE of FIG. 2 is designed to monitor 2 lines from the antenna system, 2 lines from the graphics system, 1 line from the video processor, and 7 internal lines. Specifically, the internal lines are the signal lines monitored on a board which contains the BITE circuitry. This board may be the scan converter board of the radar system. The primary function of such a scan converter board is to convert input data in polar coordinate format into cartesian coordinate format. The antenna lines are denoted as ANTENNA1 and ANTENNA2. The graphics lines are denoted as GRAPHICS1 and GRAPHICS2. The video processor line is denoted as VIDEO1. The internal lines are denoted as INTERNAL1, INTERNAL2, INTERNAL3, INTERNAL4, INTERNAL5, INTERNAL6, and INTERNAL7. The ANTENNA lines and the GRAPHICS lines are "fast" signals and INTERNAL1 through INTERNAL4 are "fast" lines. The VIDEO line is a "slow" line as are INTERNAL5, INTERNAL6, and INTERNAL7. The BITE of FIG. 2 provides a visual yellow indication in response to a failed line in the antenna system, the graphics system, and in the video processor. A red indication is provided upon the occurance of a time out error on any of the tested INTERNAL lines. A 4-bit error status word is also provided on a bus and discrete outputs are available to provide additional diagnostic information.

Accordingly, the ANTENNA lines to be tested, the GRAPHICS lines to be tested, and INTERNAL1 through INTERNAL4 are applied to the respective inputs 10 of the multiplexor 11. Similarly, INTERNAL5 through INTERNAL7 and VIDEO1 are applied to the respective inputs 14 of the multiplexor 15.

The dual timer 19 is comprised of a fast clock circuit 40 that provides the fast clock signal on the line 20 and a slow clock circuit 41 that provides the slow clock signal on the line 21. The fast clock signal on the line 20 is applied to the clock input of the 4-bit counter 22. The stages of the counter 22 are denoted as 1QA, 1QB, 1QC, and 1QD. The stages 1QA and 1QB provide the signals on the lines 24 to the logic array 18 and are denoted as F1QA and F1QB, respectively. The output F1QC from the stage 1QC is applied to the reset input of the counter 22 and as the clock input to the 4-bit counter 23. The stage 1QD is not utilized.

The stages of the counter 23 are denoted as 2QA, 2QB, 2QC, and 2QD. The respective outputs from 2QA, 2QB, and 2QC are applied on the lines 26 as F2QA, F2QB, and F2QC, respectively, which provide the select input 13 to the multiplexor 11. The signals F2QB and F2QC are also applied to the logic array 18 to provide decoding information with respect to the line selected for test by the multiplexor 11. The output from the stage 2QD denoted as F2QD is applied via a line 42 to the reset input of counter 23.

The counters 22 and 23 are standard binary counters that count in a standard binary sequence. Counter 22 counts from 0 to 4 and counter 23 counts from 0 to 8. In a manner to be described in further detail with respect to FIG. 3, the logic array 18 includes D-flip flops utilized in detecting time out errors on the monitored lines 10. The signal on the line 12 is applied to the clock inputs of the D-flip flops and the D inputs thereof are connected to logic high. With both of the counters 22 and 23 reset to zero, the lines 26 at the select input 13 control the multiplexor 11 to connect the ANTENNA1 signal to the FASTIN line 12. The F2QB and F2QC outputs from the counter 23 set up the logic in the logic array 18 for testing the ANTENNA1 line. When F1QA goes high, the D-flip flops in the logic array 18 are cleared. When both F1QA and F1QB are high, a clock is generated in the logic array 18 to test the status of the D-flip flops. If in the time interval between F1QA going high and both F1QA and F1QB going high, the monitored line connected to the line 12 does not toggle, the associated D-flip flop remains cleared and an error status is indicated. If the tested line toggles within the test time interval, the associated D-flip flop is set and no failure is indicated. When F1QC goes high, counter 22 is reset and counter 23 is advanced to select the next line 10 at the multiplexor 11. This sequence continues until F2QD goes high and then repeats. In this manner the lines 10 to be tested are sequentially applied to the logic array 18 and are tested sequentially for time out error.

In a similar manner, the counters 27 and 28 comprise standard binary counters counting in the standard binary sequence. The outputs S1QA and S1QB from the counter 27 are applied to the logic array 18 for the reasons described above with respect to the signals F1QA and F1QB from the counter 22. The counter 27 counts from 0 through 4 controlling the actions with respect to the "slow" signals as described above with respect to the counter 22 and the "fast" signals. The counter 28 selects the inputs 14 for the multiplexor 15 and provides signals to the logic array 18 for error status differentiation. Since the multiplexor 15 only receives 4 input lines to be tested, only the outputs S2QA and S2QB are required from the counter 28 for the sequential selection thereof. The output S2QC of the counter 28 is employed, via a line 43, to reset the counter 28 and the stage 2QD of the counter 28 is not utilized. The SLIN output from the multiplexor 15 on the line 16 is applied to the logic array 18 in the manner described above with respect to the line 12. Thus, the counter 28 counts from 0 to 4 to sequence through the lines 14 and accordingly set up logic in the logic array 18.

Figure 3:
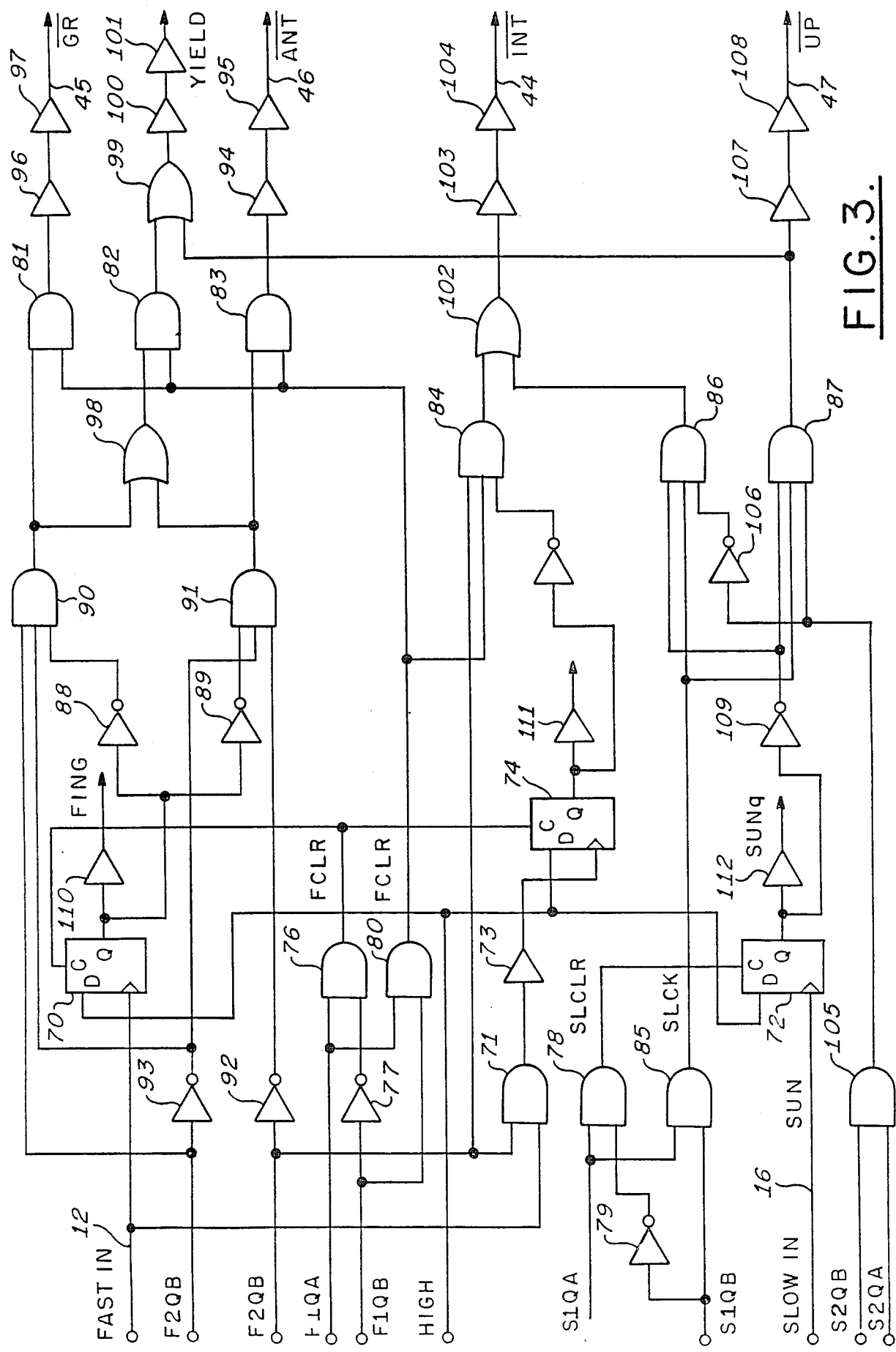
FIG. 3 is a detailed logic diagram of the logic array of FIG. 2.

In a manner to be described in detail with respect to FIG. 3, the logic array 18 provides signals on lines 44, 45, 46, and 47 to differentiate the error status of an INTERNAL, GRAPHICS, ANTENNA, and VIDEO PROCESSOR line, respectively. The logic array 18 also provides signals FINq, FINTq, SLINq, and YELLO for diagnostic purposes.

The dual time 19 of FIG. 1 provides timing for the "fast" and "slow" signal lines to be tested. The fast clock signal on the line 20 in conjunction with the counter 22 determines the test interval for the "fast" signals. The slow clock signal on the line 21 in conjunction with the counter 27 determines the test interval for the "slow" signals. If the line to be monitored selected from the inputs 10 or the line to be monitored selected from the inputs 14 does not toggle within the associated test interval, the logic array 18 sets the appropriate one of the lines 32 to the appropriate logic state.

The lines 44–47 are applied to the set inputs of flip-flops 48, 49, 50, and 51, respectively. The reset input to each of the flip-flops 48–51 is connected to a reset terminal 52. At the beginning of each cycle a pulse is applied to the reset terminal 52 to reset the flip-flops 48–51. If an error occurs on any of the monitored input lines, the appropriate flip-flop is toggled. If a failure occurs on one of the ANTENNA lines, flip-flop 50 is set. If a failure occurs on one of the GRAPHICS lines the flip-flop 49 is set. If failure occurs on one of the INTERNAL lines, the flip-flop 48 is set and if failure occurs on the VIDEO line, the flip-flop 51 is set.

The output of the flip-flop 48 is coupled through an inverter 53 to a light emitting diode (LED) 54 which in turn is connected to VCC. The LED 54 is selected to provide a red indicium. If one of the INTERNAL lines (fast or slow) experiences a time out error the LED 54 is turned on signaling this failure.

The outputs from the flip-flops 49, 50, and 51 are coupled through respective inverters 55, 56, and 57 to an LED 58 which is coupled to VCC. The LED 58 is selected to provide a yellow indicium. Thus, if a failure occurs on any of the GRAPHICS, ANTENNA, or VIDEO lines (fast or slow) the LED 58 is turned on designating this type of failure. The outputs from the flip-flops 48–51 form a 4-bit error status word that is provided to a bus 59.

It is appreciated, therefore, that the logic array 18 monitors the selected signal lines and indicates the status thereof. The logic array 18 tests both "fast" and "slow" signals simultaneously. The BITE circuitry of FIG. 2 has the capacity for monitoring 16 signal lines with the hardware required for only one line. Additionally, separate timing is utilized to test the individual signals.

Referring to FIG. 3, in which like reference numerals indicate like elements with respect to FIG. 2, a detailed logic schematic of the logic array 18 of FIG. 2 is illustrated. The output line 12 from the multiplexor 11 is applied to the clock input of a D-flip flop 70 as well as for providing an input to an AND gate 71. The output line 16 from the multiplexor 15 is applied as the clock input to a D-flip flop 72. The output of the AND gate 71 is applied through a driver 73 as the clock input of a D-flip flop 74. The D-inputs to the flip-flops 70, 72, and 74 are connected to logic high via a terminal 75 which receives a pull-up signal.

An AND gate 76 provides a fast clear (FCLR) signal to the clear inputs of the flip-flops 70 and 74. The AND gate 76 receives as inputs, the F1QA signal and the F1QB signal from the counter 22 (FIG. 2). F1QB is applied through an inverter 77. Thus, when F1QA is high and F1QB is low the AND gate 76 clears the flip-flops 70 and 74. This occurs on the count of "1" of the counter 22. In a similar manner the flip-flop 72 is cleared by an SLCLR signal from an AND gate 78. The AND gate 78 receives S1QA and S1QB from the counter 27 (FIG. 2). S1QB is applied to the AND gate 78 through an inverter 79. Thus, the flip-flop 72 is cleared upon the occurance of the count of "1" of the counter 27.

An AND gate 80 respective to F1QA and F1QB provides a signal denoted as FCLK utilized to gate through the error status of the "fast" lines under test. The FCLK signal is generated when both F1QA and F1QB are high. Thus, FCLK is provided by the AND gate 80 upon the counter 22 attaining the count of "3".

The FCLK signal is applied as an input to AND gates 81, 82, 83, and 84 to gate through the error status indications in a manner to be described.

In a similar manner, an AND gate 85 provides a signal denoted as SLCK. The AND gate 85 is responsive to S1QA and S1QB such the SLCK is provided when the counter 27 attains the count of "3". The SLCK signal is applied as an input to AND gates 86 and 87 to gate through error status indications with respect to the "slow" lines under test.

The output of the flip-flop 70 is coupled through inverters 88 and 89 as inputs to AND gates 90 and 91, respectively. The AND gate 90 also receives as inputs F2QB and F2QC through an inverter 92. The AND gate 91 also receives as inputs F2QB through an inverter 93 and F2QC through the inverter 92. It is thus appreciated that the AND gate 91 will only be enabled by the outputs of the counter 23 (FIG. 2) when the multiplexor 11 is selecting an ANTENNA line. Similarly the AND gate 90 will be enabled only when the multiplexor 11 is selecting a GRAPHICS line.

Upon the occurance of FCLR the flip-flop 70 is cleared. This enables AND gates 90 and 91 via the inverters 88 and 89. If the selected line under test, applied as FASTIN, toggles prior to the occurance of FCLK, the flip-flop 70 is set, disabling the AND gates 90 and 91. If however, the selected line does not toggle prior to the occurance of FCLK, the flip-flop 70 remains in the cleared state and AND gate 90 will be enabled when FCLK occurs if a GRAPHICS line is selected and AND gate 91 will be enabled when FCLK occurs if an ANTENNA line is selected.

The AND gate 81 receives the output of the AND gate 90 and the AND gate 83 receives the output of the AND gate 91. Thus, if a time out error occurs on one of the ANTENNA lines, FCLK propagates through the enabled AND gate 83 and through an inverter 94 and a driver 95 to provide the ANTENNA line failure status on the line 46. Similarly, if one of the GRAPHICS lines fails, FCLK propagates through the enabled AND gate 81, an inverter 96 and a driver 97 to provide the GRAPHICS failure status on the line 45.

The outputs of the AND gates 90 and 91 are applied as inputs to an OR gate 98. The output of the OR gate 98 is applied through the AND gate 82 to an OR gate 99, an inverter 100 and a driver 101 to provide the YELLO signal for diagnostic purposes. It is appreciated that upon the occurance of FCLK in the presence of either an ANTENNA line failure or a GRAPHICS line failure the YELLO indicium is provided by the driver 101.

The flip-flop 74 and the AND gate 84 are utilized to detect failures of the "fast" INTERNAL lines applied as inputs to the multiplexor 11 (FIG. 2). As previously described, the FASTIN signal is applied to clock the flip-flop 74 through the AND gate 71. The AND gate 71 also receives the F2QC signal from the counter 23 (FIG. 2). Thus, the flip-flop 74 will only receive clocking signals when the "fast" INTERNAL lines are being tested by the multiplexor 11 (FIG. 2). Additionally, the AND gate 84 receives the F2QC signal so that the AND gate 84 can only be enable when the "fast" INTERNAL lines are being tested. The flip-flop 74 operates in a manner similar to that described above with respect to the flip-flop 70 to enable the AND gate 84 in the event of a "fast" INTERNAL line failure upon the occurance of FCLK. A failure status for a "fast" INTERNAL line propagates through an OR gate 102, an inverter 103, and a driver 104 to provide the failure status signal on the line 44.

In a manner similar to that described above with respect to the "fast" signal lines to be tested, the flip-flop 72 and the AND gates 86 and 87 are utilized to detect and discriminate the error status of the "slow" INTERNAL lines and the VIDEO line applied to the multiplexor 15 (FIG. 2). The S2QA and S2QB signals from the counter 28 (FIG. 2) are applied through an AND gate 105 as an input to the AND gate 87 and, through an inverter 106, as an input to the AND gate 86 to differentiate the error status. The AND gate 86 is utilized to differentiate "slow" INTERNAL failures and the AND gate 87 is utilized to differentiate the VIDEO line failure. The output of the AND gate 86 is applied through the OR gate 102 to provide the INTERNAL error status on the line 44. The output of the AND gate 87 propagates through an inverter 107 and a driver 108 to provide the VIDEO error status on the line 47. The output of the flip-flop 72 is applied through an inverter 109 to the inputs of the AND gates 86 and 87 so that SLCK propagates appropriately therethrough in the event of a "slow" INTERNAL error or a VIDEO error. The output of the AND gate 87 also contributes to the YELLO signal via the OR gate 99.

The outputs of the flip-flops 70, 74, and 72 are applied through drivers 110, 111, and 112 to provide the FINq, FINTq, and SLINq signals, respectively, for diagnostic purposes.

Because the present invention monitors a plurality of signal lines with the hardware required for only one line, hardware cost and space is minimized while maximizing the number of signal lines that can be monitored by the BITE circuitry. On-line error status of signals on printed wiring boards, and the like, is achieved at minimum cost since standard components are utilized. The invention may be employed in all technologies that utilize built-in test equipment.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Built-in test equipment (BITE) for a system having a plurality of subsystems, said system including lines to be tested by said BITE, said lines comprising fast lines and slow lines, each said fast line normally having a signal thereon of a first periodicity, each said slow line normally having a signal thereon of a second periodicity, said second periodicity being longer than said first periodicity, said lines to be tested comprising groups of lines associated with said subsystems, respectively, at least one of said groups comprising both fast lines and slow lines, said BITE comprising a plurality of error status indicating means for indicating error status of said subsystems, respectively, first multiplexer means having a first multiplexer output and responsive to said fast lines for multiplexing said fast lines to said first multiplexer output in response to first control signals, second multiplexer means having a second multiplexer output and responsive to said slow lines for multiplexing said slow lines to said second multiplexer output in response to second control signals, first sequencing means for generating said first control signals for controlling said first multiplexer means to sequentially couple said fast lines to said first multiplexer output to provide a fast line under test, second sequencing means for generating said second control signals for controlling said second multiplexer means to sequentially couple said slow lines to said second multiplexer output to provide a slow line under test, first testing means responsive to said first multiplexer output for providing a fast test output in accordance with whether said first multiplexer output fails to toggle within a first time interval, thereby providing an error indication, second testing means responsive to said second multiplexer output for providing a slow test output in accordance with whether said second multiplexer output fails to toggle within a second time interval, thereby providing an error indication, said second time interval being longer than said first time interval, and gating means responsive to said fast and slow test outputs and to said first and second control signals for actuating an appropriate one of said error status indicating means in accordance with said error indication from said first or second testing means and in accordance with said group containing said fast or slow line under test that resulted in said error indication, so as to provide an error status indication with respect to said subsystems, respectively.

2. The apparatus of claim 1 wherein
said first testing means includes first counter means for defining said first time interval, and
said first sequencing means includes second counter means for generating said first control signals, said second counter means being clocked by said first counter means.

3. The apparatus of claim 2 wherein
said second testing means includes third counter means for defining said second time interval, and
said second sequencing means includes fourth counter means for generating said second control signals, said fourth counter means being clocked by said third counter means.

4. The apparatus of claim 1 wherein said system comprises a radar display system and said subsystems comprise an antenna subsystem, a graphics subsystem, a video subsystem and an internal subsystem of said radar display system,
said plurality of error status indicating means comprising means for indicating error status of said antenna subsystem, said graphics subsystem, said video subsystem and said internal subsystem, respectively.

* * * * *